(12) United States Patent
Xiao

(10) Patent No.: US 6,382,744 B1
(45) Date of Patent: May 7, 2002

(54) COMPUTER CASING

(75) Inventor: Yong Xiao, Shenzhen (CN)

(73) Assignee: Hoa Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/753,775

(22) Filed: Jan. 3, 2001

(51) Int. Cl.[7] .............................................. A47B 97/00
(52) U.S. Cl. ................................... 312/223.2; 312/263
(58) Field of Search ......................... 312/223.1, 223.2, 312/257.1, 263, 265.1, 265.5, 265.6; 361/724, 725, 726, 683; 220/4.02, 4.28

(56) References Cited

U.S. PATENT DOCUMENTS 5,593,219 A * 1/1997 Ho ....................... 312/265.5 X
5,845,977 A * 12/1998 Neukam et al. ......... 312/223.2
5,931,550 A * 8/1999 Chen ................... 312/223.2 X
5,944,398 A * 8/1999 Wu ......................... 312/223.2
5,975,659 A * 11/1999 Yang et al. .............. 312/223.2
6,231,140 B1 * 5/2001 Chen ....................... 312/223.2

* cited by examiner

Primary Examiner—James O. Hansen
(74) Attorney, Agent, or Firm—Wei Te Chung

(57) ABSTRACT

A computer casing (30) includes a frame (100) and a pair of side panels (200) secured to the frame. The frame includes a bottom panel (102), a top panel (108), a front panel (104), and a rear panel (106). The front and rear panels are engaged between the top panel and the bottom panel. A pair of first flanges (110) extends from opposite edges of the bottom panel. A pair of second flanges (116) depends from opposite edges of the top panel. Each first flange defines a plurality of rectangular slots (122) therein. Each second flange defines a plurality of second slots (128) therein. A pair of hems (210) is formed at top and bottom edges of each side panel. Each hem forms a plurality of hooks (212) for engaging with the slots of the flanges, thereby securing the side panels to the frame to form the complete computer casing.

6 Claims, 4 Drawing Sheets

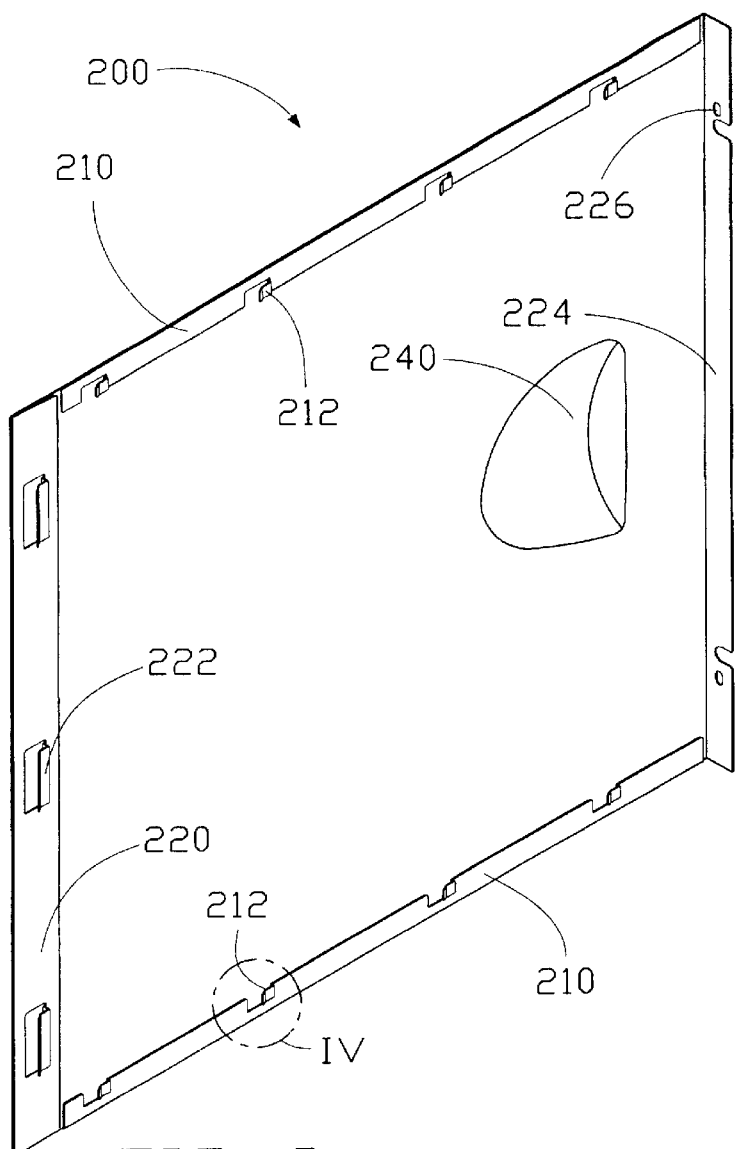
FIG. 3
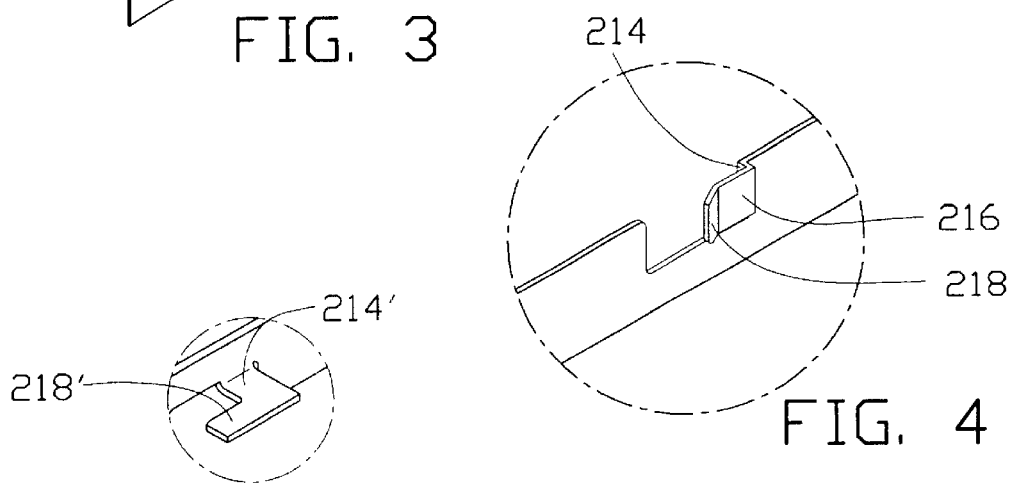
FIG. 6
FIG. 4

COMPUTER CASING

BACKGROUND OF THE INVENTION

1. Field of the Invention

The present invention relates to a computer casing, and more particularly to a computer casing which is labor-saving in assembly and disassembly.

2. Related Art

A computer casing generally comprises a bottom panel, a front panel, a rear panel and a top panel. The bottom panel, front panel, rear panel and top panel together define a pair of opposite openings. A pair of side panels is secured to the casing to cover the openings. A pair of flanges respectively extends vertically from each of the top and bottom panels, toward each other. A plurality of slots is defined in the flanges. Each slot comprises a large portion and a small portion. Each side panel forms a plurality of hooks corresponding to the slots of the flanges. Each hook is similar in width to the small portion of each slot. In assembly, the hooks are inserted into the large portions of the slots. The side panels are pushed to cause the hooks to engage with the small portions of the slots. Screws are then used to enhance the engagement of the side panels with the casing.

Unfortunately, when the hooks of each side panel enter the small portions of the slots, large interference occurs between the hooks and the flange at the slots. In order to ensure proper attachment of the side panels to the casing, each side panel must be pushed with excessive force. Thus the assembly procedure is laborious and time-consuming. Furthermore, disassembly of the casing is also laborious, due to the large interference between the hooks and the flanges.

SUMMARY OF THE INVENTION

Accordingly, an object of the present invention is to provide a computer casing which is labor-saving in assembly and disassembly.

To achieve the above-mentioned object, a computer casing includes a frame and a pair of side panels secured to the frame. The frame includes a bottom panel, a top panel, a front panel, and a rear panel. The front and rear panels depend from the top panel and are engaged with the bottom panel. A pair of first flanges extends from opposite edges of the bottom panel. A pair of second flanges depends from opposite edges of the top panel. Each first flange defines a plurality of rectangular slots therein. Each second flange defines a plurality of slots therein. A pair of hems is formed at top and bottom edges of each side panel. Each hem forms a plurality of hooks for engaging with the slots of the flanges, thereby securing the side panels to the frame to form the complete computer casing.

Other objects, advantages and novel features of the present invention will be drawn from the following detailed embodiments of the present invention with attached drawings, in which:

BRIEF DESCRIPTION OF THE DRAWINGS

FIG. 3 is an enlarged view of a side wall of FIG. 1.

FIG. 4 is an enlarged view of the circled portion IV of FIG. 3.

FIG. 6 is an enlarged view of the circled portion VI of FIG. 5.

DETAILED DESCRIPTION OF THE PREFERRED EMBODIMENTS

Figure 1:
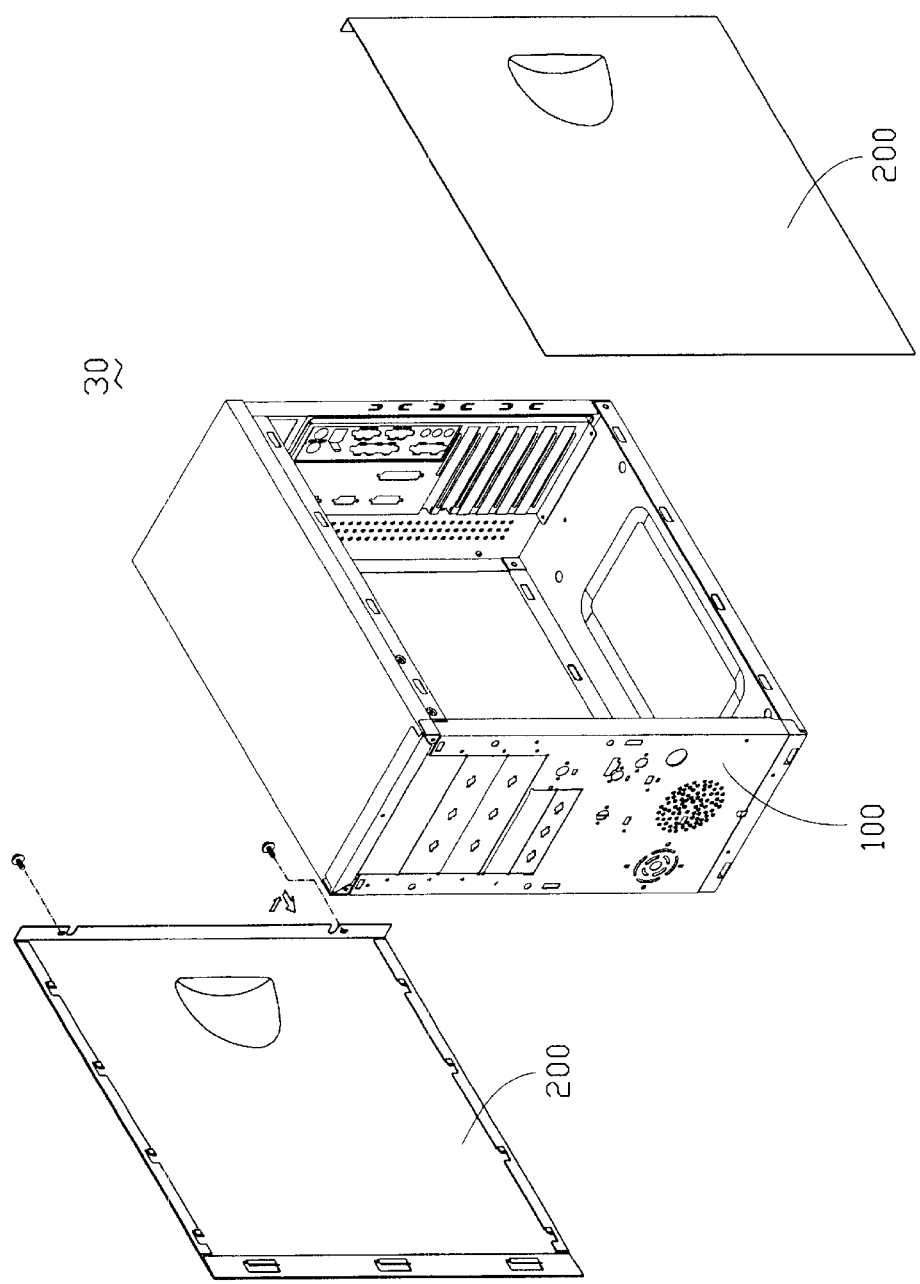
FIG. 1 is an exploded view of a computer casing in accordance with a preferred embodiment of the present invention.

Referring to FIG. 1, a computer casing 30 in accordance with a preferred embodiment of the present invention comprises a frame 100 and a pair of side panels 200.

Figure 2:
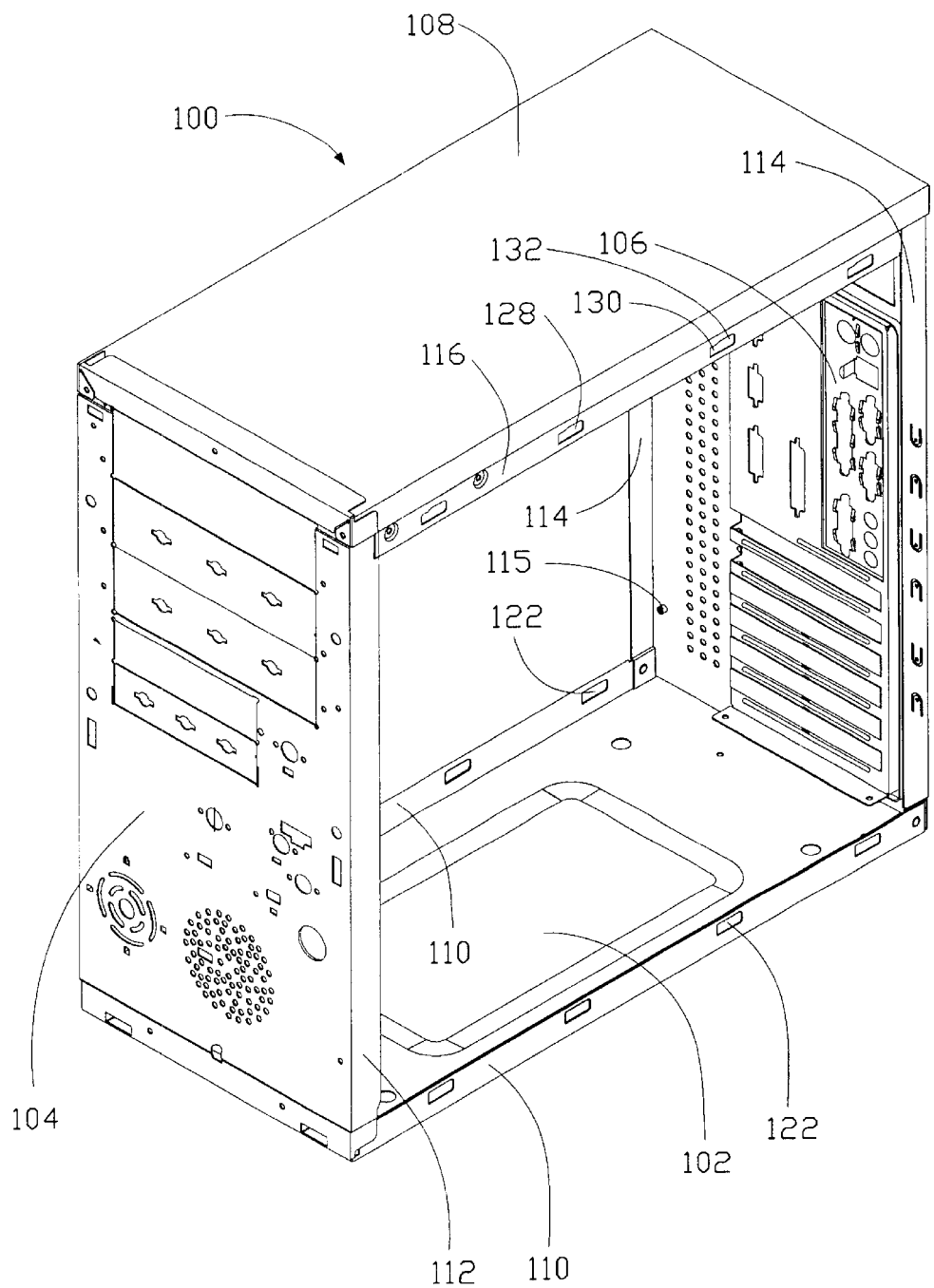
FIG. 2 is an enlarged view of a frame of FIG. 1.

Referring particularly to FIG. 2, the frame 100 comprises a bottom panel 102, a front panel 104, a rear panel 106 and a top panel 108. The top panel 108 is parallel to the bottom panel 102. The front panel 104 and the rear panel 106 respectively depend vertically from opposite ends of the top panel 108. Bottom ends of the front panel 104 and the rear panel 106 are engaged with opposite ends of the bottom panel 102 by conventional means. First, second, third and fourth flanges 110, 116, 112, 114, extend inwardly from opposite edges of each of the bottom panel 102, top panel 108, front panel 104, and rear panel 106 respectively. The first flanges 110 of the bottom panel 102 define a plurality of rectangular first slots 122. The flanges 116 of the top panel 108 define a plurality of second slots 128. A length of each second slot 128 is the same as a length of each rectangular slot 122. Each second slot 128 comprises a narrow portion 130 and a wide portion 132. Each narrow portion 130 is at an end of each second slot 128 which is nearest the front panel 104. A width of each wide portion 132 of each second slot 128 is similar to a width of each rectangular slot 122. A pair of vertically aligned screw holes 115 (only one visible) is defined in each of opposite sides of the rear panel 106.

Referring to FIG. 3, each side panel 200 of the computer casing 30 is a single metal plate. A pair of first hems 210 is inwardly formed at top and bottom edges of the side panel 200 respectively. A plurality of hooks 212 is formed on each first hem 210, corresponding to the rectangular first slots 122 and the second slots 128 of the frame 100. Each hook 212 is similar in width to the narrow portion 130 of each second slot 128. A second hem 220 is inwardly formed at front edge of each side panel 200. A plurality of latching tabs 222 is formed on each first hem 220. A free end of each latching tab 222 is nearest the front edge of the side panel 200. A rim 224 extends perpendicularly from a rear edge of each side panel 200. A pair of through holes 226 is defined in the rim 224, corresponding to the screw holes 115 of the rear panel 106. A depression 240 is inwardly formed in each side panel 200, for facilitating detachment of the side panel 200 from the frame 100.

Referring particularly to FIG. 4, each hook 212 comprises a latching portion 214, a connecting portion 216 and a guiding portion 218. The latching portion 214 extends perpendicularly from the hem 210. The connecting portion 216 extends perpendicularly from the latching portion 214, parallel to the hem 210. The guiding portion 218 extends from an end of the connecting portion 216 toward a front edge of the side panel 200, and slightly inwardly.

Referring to FIGS. 1–4, in assembly, the hooks 212 of each side panel 200 are respectively inserted into the rectangular slots 122 and the wide portions 132 of the second slots 128. The rims 224 of the side panels 200 are pushed horizontally toward the front panel 104. At this stage, the latching portions 214 of the hooks 212 respectively are received in the narrow portions 130 of the second slots 128, and abut edges of the first flanges 110 at front extremities of the rectangular slots 122 of the first flanges 110. The latching tabs 222 of the second hem 220 abut inner edges of the third flanges 112 of the front panel 104. The rims 224 of the side panels 200 abut an outer surface of the rear panel 106. Screws (not labeled) are inserted into the through holes 226 of the rims 224 to engage with the screw holes 115 of the rear panel 106. The side panels 200 are thus secured to the frame 100 to form the computer casing 30.

Figure 5:
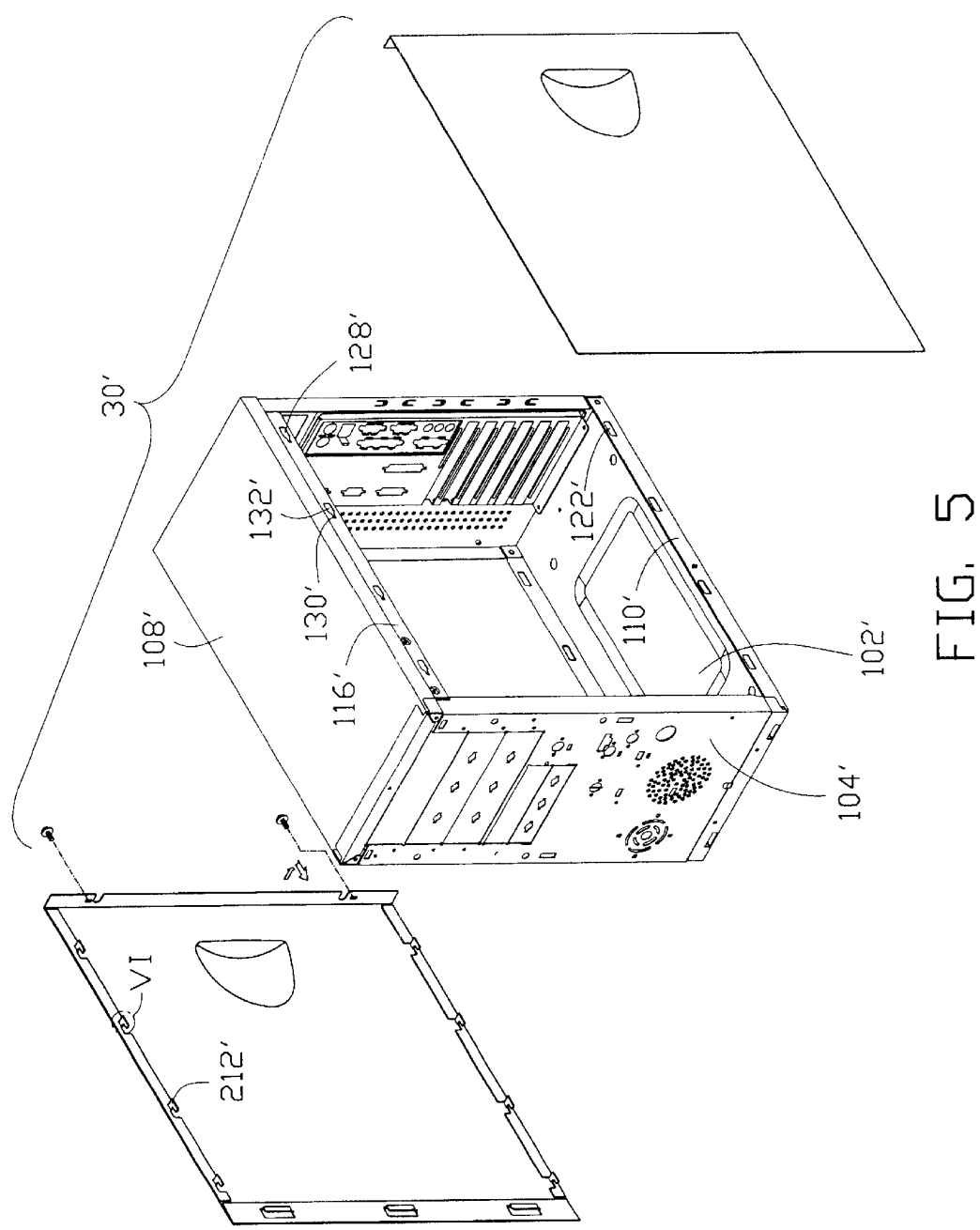
FIG. 5 is an exploded view of a computer casing in accordance with an alternative embodiment of the present invention.

Referring to FIGS. 5 and 6, a computer casing 30' in accordance with an alternative embodiment of the present invention is similar to the computer casing 30 of the preferred embodiment. However, each slot 128' of a top panel 108' comprises an elongated portion 130' nearest a front panel 104', and a wide portion 132' farthest from the front panel 104'. Each hook 212' is horizontal, and L-shaped. Each hook 212' comprises a latching portion 214' extending perpendicularly from a hem 210', and a guiding portion 218' extending perpendicularly from the latching portion 214'. For brevity, a detailed description of the computer casing 30' is omitted herein. Instead, reference is made to the detailed description of the computer casing 30, with due alteration of details.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer casing comprising:
a frame (100) comprising a bottom panel (102), a top panel (108), a front panel (104) and a rear panel (106), the front and rear panels depending from the top panel and engaged with the bottom panel, a first flange (110) extending from at least one edge of the bottom panel, a second flange (116) extending from at least one edge of the top panel toward the first flange, the first flange defining a plurality of first slots (122) therein, the first slots being rectangular, the second flange defining a plurality of second slots (128) therein, each second slot having a length similar to a length of each first slot and comprising a narrow portion and a wide portion; and
at least one side panel (200) secured to the frame, a pair of hems (210) being formed at opposite edges of the at least one side panel, each hem forming a plurality of hooks (212), the hooks engaging in the first slots and said narrow portions of the second slots of the frame, respectively, each first slot being similar in width to the wide portion of each second slot.

2. The computer casing as recited in claim 1, wherein each hook is similar in width to the narrow portion (130) of each second slot.

3. The computer casing as recited in claim 1, wherein each hook comprises an engaging portion (214), a connecting portion (216) extending from the engaging portion and a guiding portion (218) extending from the connecting portion, the engaging portion engaging in the first and second slots of the frame.

4. The computer casing as recited in claim 1, wherein each hook comprises an engaging portion (214') for respectively engaging with the first and second slots and a guiding portion (218') extending from the engaging portion.

5. The computer casing as recited in claim 1, wherein an additional hem (220) extends from a front edge of each side panel, and a plurality of latching tabs is formed on the additional hem for abutting the front panel of the frame.

6. The computer casing as recited in claim 1, wherein a rim (224) extends from a rear edge of said at least one side panel for abutting the rear panel of the frame, and at least one through hole is defined in said rim, said at least one through hole receiving one screw to secure the at least one side panel to the frame.

* * * * *